2,859,676
POWER WEEDER

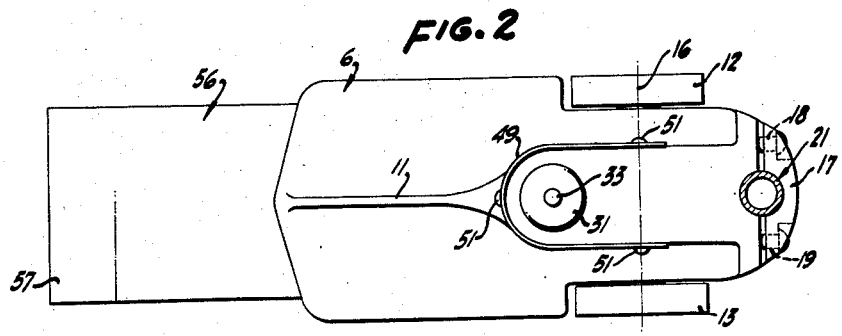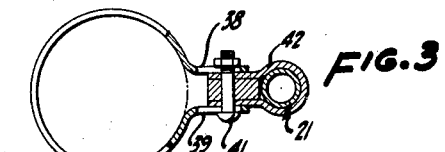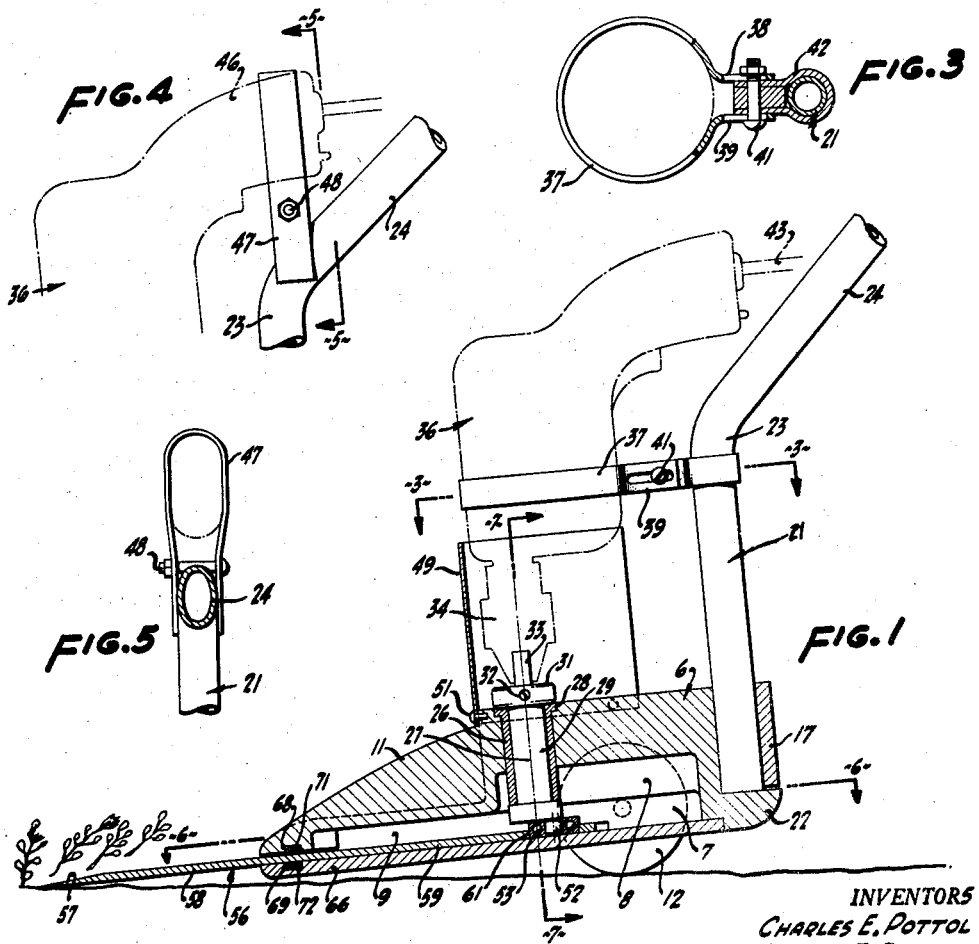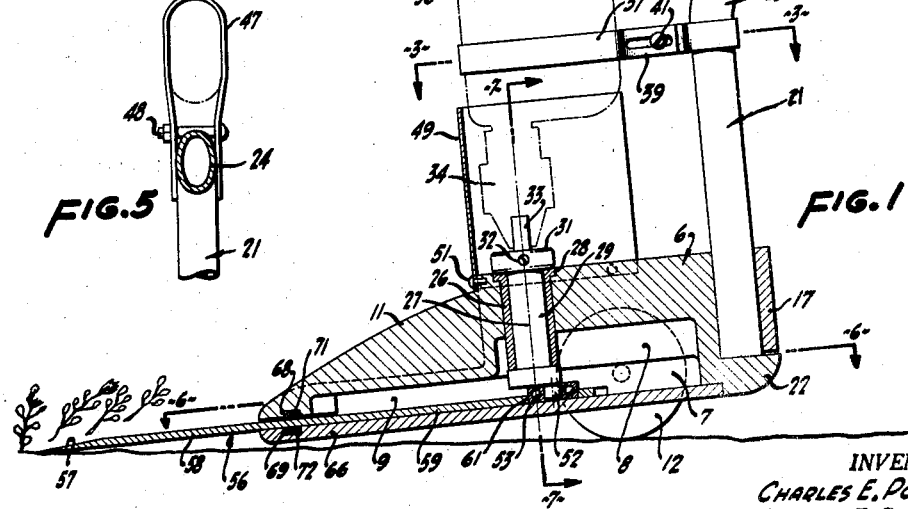

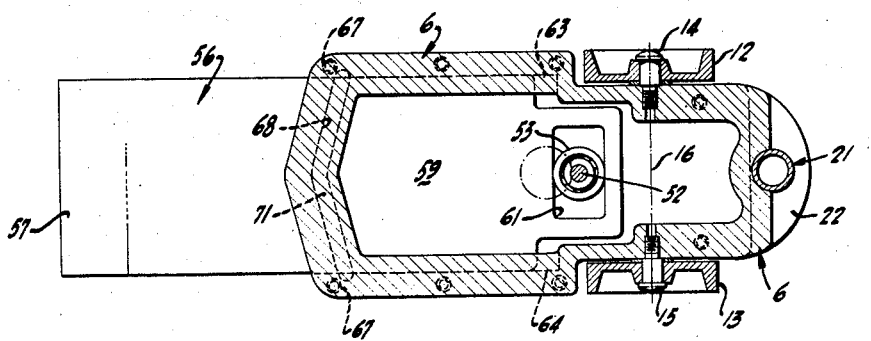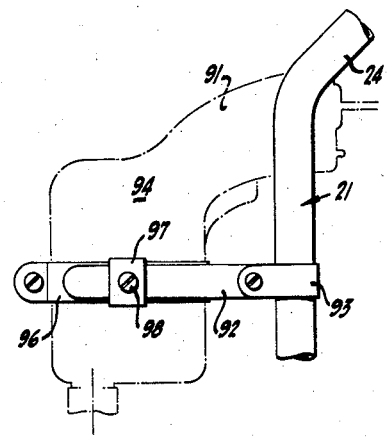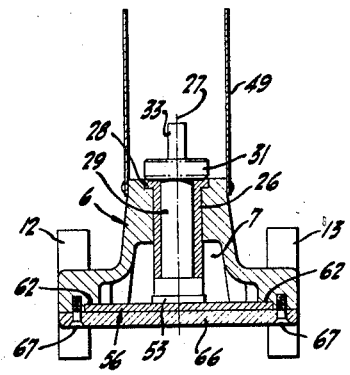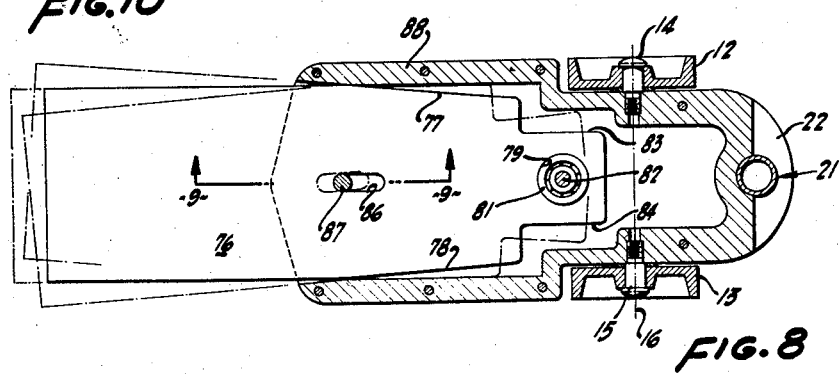
INVENTORS
CHARLES E. POTTOL
BY ROBERT F. POTTOL
ATTORNEY

United States Patent Office 2,859,676
Patented Nov. 11, 1958

Charles E. Pottol, Oakland, and Robert F. Pottol, Vacaville, Calif.

Application November 10, 1954, Serial No. 467,994

4 Claims. (Cl. 97—44)

The invention relates primarily to domestic accessories and particularly to a power operated garden tool useful in cutting off weeds close to the surface of the ground and for performing cultivation of the ground.

One of the onerous duties in gardening is the removal of unwanted growths such as weeds and old plants from garden plots and random areas. The operation of a hoe for this purpose is reasonably effective in most instances but is laborious and slow.

It is therefore an object of the invention to provide a power weeder effective to remove the weeds from adjacent the surface of the ground utilizing a suitable source of power such as an electric motor or the like.

Another object of the invention is to provide a power weeder effective for the purpose and conveniently actuated by an electric utility or drill motor of the sort now customarily found in many households.

Another object of the invention is to provide a power weeder which is readily manipulable by the operator to produce the desired result.

Another object of the invention is to provide a power weeder which is easily dismounted for storing, which can easily accommodate any of a variety of different power motors, is readily fabricated and serviced and is conveniently arranged for storage in shipment and domestically.

It is a still further object of the invention to provide a power weeder which is relatively simple in design, economical of manufacture and light and simple to maintain and operate.

Other objects, together with the foregoing, are attained in the forms of power weeder described in the accompanying description and illustrated in the accompanying drawings, in which Figure 1 is a side elevation, with a portion shown in cross section on a vertical longitudinal plane, of one form of power weeder constructed in accordance with the invention, a part of the structure being broken away to reduce the figure size.

Figure 2 is a plan of the form of power weeder shown in Figure 1 with the power source omitted and with a part of the handle shown in cross section.

Figure 3 is a plan in detail showing one form of clamp for precluding rotation of the driving motor.

Figure 4 is a side elevation in detail showing another form of clamp for preventing rotation of the driving motor.

Figure 5 is a cross section the plane of which is indicated by the line 5—5 of Figure 4.

Figure 6 is a cross section, the plane of which is indicated by the line 6—6 of Figure 1.

Figure 7 is a cross section, the plane of which is indicated by the line 7—7 of Figure 1.

Figure 8 is a view comparable to Figure 6 but showing a modified form of power weeder in accordance with the invention.

Figure 9 is a fragmentary view comparable to a part of Figure 1, and showing a portion of the modification of Figure 8 in cross section, the plane of which is indicated by the line 9—9 of Figure 8.

Figure 10 is a side elevation in detail showing still another form of motor clamp.

In the form of power weeder especially illustrated in Figures 1 to 7, inclusive, there is preferably provided a housing 6 conveniently fabricated of light metal such as aluminum, either cast or otherwise shaped, to provide a bottom recess 7 of irregular contour and having a generally rearward enlarged portion 8 and a forward reduced portion 9, the latter being stiffened by a central rib 11 although the remaining part of the housing is relatively smooth and without projections.

Somewhat to the rear of the center of gravity of the housing is disposed a pair of ground engaging wheels 12 and 13 of relatively small diameter. The wheels are preferably mounted on stub axles 14 and 15 which are screwed into the housing 6 with the wheels 12 and 13 disposed on a common transverse axis 16 for ready rotation.

To the rear of the wheels, the housing 6 is provided with a cap 17 removably secured in position by fastenings 18 and 19 and effective when secure to clamp the lower end of a handle 21. The handle is preferably fabricated of relatively light tubing cut off squarely at its lower end to rest on a shelf 22 formed integrally with the housing 6. The handle extends substantially vertically upwardly from the shelf for a short distance and then is provided with a rearwardly extending bend 23 and an angular portion 24 extending to any suitable grip not shown. Because of the variable friction of the cap 17, the handle 21 can not only be withdrawn from the housing 6 but can also be turned to any convenient angle and then clamped in position.

In the housing 6 forwardly of the handle 21 and, in fact, forwardly of the axis 16 of the ground engaging wheels 12 and 13 is a journal bushing 26 of circular cylindrical form arranged with its axis 27 substantially normal to the rotational axis 16 of the wheels 12 and 13. The journal 26 not only extends into the enlarged portion 8 of the recess 7 but at its upper end carries a thrust flange 28 recessed within the upper portion of the housing 6.

Mounted to rotate within the journal 26 is a drive shaft 29 at its upper end receiving a thrust collar 31 secured in position by a set screw 32 and having a reduced portion 33 to receive the chuck 34 and support the weight of any suitable source of power such as an electric drill motor 36. Since the thrust collar 31 rests upon the thrust flange 28, the chuck 34 not only engages the upper end 33 of the drive shaft for rotation in unison and not only is automatically aligned, but also serves as a support for the entire vertical load of the electric drill motor.

The drill motor casing would itself rotate in the absence of some restraint. There is preferably provided either a strap of the sort shown in Figures 1 and 3, a strap of the sort shown in Figures 4 and 5, or a strap as shown in Figure 10.

In the first version, the motor 36 is encompassed by a clamp strap 37 which at its opposite ends terminates in a pair of ears 38 and 39 appropriately slotted to receive a fastener 41. Also engaged with the fastener 41 is a clamp 42 encompassing the handle 21. When the fastener 41 is removed, the electric motor 36 can be detached for other uses upon release of the chuck 34. When the fastener is in position and is tightened, the motor 36 is held against rotation and can be positioned in any desired location, conveniently with the supply cord 43 running along the handle 24.

In the Figure 4 clamp form, the electric drive motor 36 has a handle 46 disposed above the bend 23. The motor is secured to the handle 24 by a U-shaped clip 47 engaging the handle 46. The depending clip ends are held against opposite sides of the handle 24 by a through fastening 48. In the Figure 10 form, the clamp can be omitted as the motor handle 91 abuts the handle 24, but a firmer rotary restrain is sometimes provided by a strap 92 having a clip 93 on the handle and secured to the motor 94 by a band 96 having a loop 97 and a fastening 98 thereon. All of the clamps or clips are very light since they restrain rotation only and do not support weight or secure alignment.

When the electric motor 36 is positioned as shown, a removable shield 49 partially surrounds the chuck 34. The shield is preferably formed of a bent plate so that the chuck is accessible to a wrench from the rear sides although the revolving portions are protected by the shield from the front and from the sides and by the handle 21 from the rear. The shield is preferably mounted on the housing 6 in a removable fashion by suitable fastenings 51.

The portion of the drive shaft 29 which depends from the journal 26 into the recess 7 is preferably off-set or provided with a crank 52 or crank pin conveniently carrying an anti-friction bearing 53 such as a ball bearing complete with inner and outer races. Adapted to engage the crank (the anti-friction bearing) is a flat cutter plate 56 preferably of generally rectangular form having a sharpened cutting edge 57 along one boundary. The plate 56 is disposed with a forward portion 58 projecting from the front of the housing 6 and with the remaining, rearward portion 59 disposed within the recess 7.

The cutter plate 56 is likewise provided with an aperture 61 encompassing the anti-friction bearing 53 on the crank pin 52. In the form of the device illustrated in Figure 6, the aperture 61 has a generally rectangular contour with the long dimension extended transversely an amount slightly greater than the total transverse component of the travel of the anti-friction bearing. There is only slight longitudinal clearance between the bearing 53 and the margins of the aperture 61. The cutter plate 56 along its side edges is supported and guided by steps 62 in the adjacent side walls 63 and 64 of the housing 6 which also define that portion of the recess 7.

Substantially closing the recess and underlying the cutter plate is a bottom plate 66 suitably secured in position by removable fastenings 67 and serving as a bed on which the cutter plate is supported against gravity. The bottom plate also serves, if necessary, as an axial retainer for the anti-friction bearing 53.

Additionally, the closure of the recess completed by the bottom plate excludes foreign matter and retains lubricant within the recess. Both the housing 6 and the cover plate 66 are provided at their forward portions with approximately V-shaped grooves 68 and 69 within which felt packings 71 and 72 are disposed. The packings contact the upper and lower faces of the cutter plate and slightly overlie the side edges thereof to assist in retaining lubricant and excluding foreign matter.

For the operation of this device, the electric motor 36 is engaged with the drive shaft end 33 and is supported thereon, the clamp such as 37 or 47 is fastened in position and the electric motor is then energized. The resulting rotation of the drive shaft 29 causes a rotation of the crank 52 and a relative longitudinal reciprocation of the cutter plate 56 at a rapid rate. The user, by grasping the handle 24, then propels the power weeder, supported generally on its wheels 12 and 13, along the surface of the ground preferably with the sharpened edge 57 slightly below the surface of the ground. The rapid reciprocation of the sharp edge acts as a sort of horizontal hoe or chisel and cuts off the weeds just at or just below the surface. The operation of the blade if sufficiently below the surface and inclined rather sharply also serves as a cultivating action to leave the surface of the soil not only free of the cut-off weeds, but also broken up and even pulverized. If an even deeper cultivation or a deeper cutting of the weed roots is desired, the operator by lifting the handle 24 and lifting the wheels 12 and 13 from the ground can incline the blade 58 even more. This has the advantage of imposing considerable weight upon the reciprocating blade 58 and assists in doing heavier work. Between operations the tool can be moved about from place to place on its wheels and can be tipped back slightly so that the sharp edge 57 of the blade is protected from encounters with the ground or rocks or other projecting objects. When the operation has been completed the motor 36 can be removed for use elsewhere by disengaging the chuck 34 from the drive shaft 33 and by slacking off the strap 37 or the clip 47.

In the modified form of structure shown in Figures 8 and 9, the arrangement is generally identical with that described except that the cutter blade 76 although of generally rectangular configuration is narrowed, as at 77 and 78, adjacent its rearward portion, and is provided not only with an aperture 79 to engage the anti-friction bearing 81 or crank 82 with a rather snug fit but is also provided with a reduced portion 83 and 84. Additionally, the cutter blade has a longitudinally extending slot 86 therein arranged to encompass a stationary guide pin 87 projecting downwardly from the housing 88. With this arrangement, the rotation of the crank 82 and of the anti-friction bearing 79 produces a substantially similar rotary movement of the adjacent portion of the cutter plate. Because of the substantial transverse component of the motion, the tapered sides 77 and 78 and the reduced portions 83 and 84 of the blade provide adequate lateral clearance. Additionally, the longitudinal slot 86 constrains the adjacent part of the cutter plate to a substantially longitudinal motion with respect to the pin 87. The cutting edge, therefore, is given a longitudinal reciprocatory and a transversely oscillatory motion, substantially as indicated by the broken lines in Figure 8, so that the transverse shearing action assists the longitudinal hoeing or chiseling action in severing the weed roots and in loosening or cultivating the ground.

What is claimed is:

1. A power weeder comprising a housing having a bottom recess, wheels on said housing and aligned on a transverse axis for supporting said housing on the ground, a handle projecting from said housing, a drive shaft, means for mounting said drive shaft in said housing with the axis of said shaft normal to said transverse axis and with one end of said shaft terminating above said housing and the other end of said shaft terminating within said recess, means engaging said handle for detachably holding against rotation the casing of a drive motor supported on and having its driving shaft in engagement with said one end of said shaft, a thrust bearing on said shaft effective to support the weight of said motor, a crank on said other end of said shaft, a cutter plate having sides thereon at right angles to said transverse axis and to the cutting edge thereof, said cutter plate being disposed to have one portion projecting from said housing and to have another portion disposed within said recess, said cutter plate having an aperture encompassing said crank, means on said housing for guiding the sides of said cutter plate, and a bottom plate engaging said housing in abutment with said cutter plate and substantially enclosing said recess.

2. A power weeder comprising a housing having a bottom recess, wheels on said housing and aligned on a transverse axis for supporting said housing on the ground, a handle projecting from said housing at the rear of said wheels, a drive shaft, means for mounting said drive shaft in said housing with the axis of said shaft normal to said transverse axis and with one end of said shaft terminating above said housing and the other end of said shaft terminating within said recess, means engaging said handle for holding against rotation the casing of a drive motor having its drive shaft in engagement with and supporting the weight of said drive motor on said one end of said shaft, a thrust bearing on said shaft effective to support the weight of said motor, a crank on said other end of said shaft, an anti-friction bearing on said crank, a cutter plate of substantially rectangular contour and sharpened on one end disposed to have one portion with said sharpened end parallel to said transverse axis and projecting from said housing to the front of said wheels and to have another portion within said recess, said cutter plate having an aperture encompassing said anti-friction bearing, means on said housing extending at right angles to said transverse axis for engaging and guiding the sides of said cutter plate, and a bottom plate engaging said housing in abutment with said cutter plate and substantially enclosing said recess.

3. A power weeder comprising a housing having a bottom recess, wheels on said housing for supporting said housing on the ground, a handle projecting from said housing, a vertical journal in said housing, said journal at the lower end thereof extending into said recess and having a thrust flange at the upper end thereof, a drive shaft mounted in said journal and having a free end extending above the upper end of said journal, a thrust collar on said drive shaft adjacent to but spaced below said free end thereof and in abutment with said thrust flange and effective to bear the weight of a drive motor, means engaging said handle for preventing rotation of the casing of a drive motor having its shaft engaging and being supported by said drive shaft, a crank on said drive shaft within said recess, a cutter plate having an aperture encompassing said crank, means on said housing for guiding said cutter plate, and means on said housing for supporting said cutter plate and for substantially closing said recess.

4. A power weeder for use with an electric motor having a chuck comprising a housing having therein a recess open at the bottom of said housing, a bottom plate fastened on the bottom of said housing and substantially closing said recess, a planar cutter plate having a cutting edge and sides substantially at right angles thereto; said cutter plate being supported on said bottom plate and disposed partly within said recess and partly projecting from the front of said housing between said housing and said bottom plate with said cutting edge exposed, means included in said housing for guiding said sides of said cutter plate, a journal mounted in said housing with the axis of said journal substantially vertical and normal to said planar cutter plate, a drive shaft rotatable in said journal and extending upwardly above said housing into a position to be engaged by said chuck and extending downwardly into said recess, means directly interconnecting said drive shaft and said cutter plate for imparting a motion to said cutter plate having a major component parallel to said sides of said cutter plate, a thrust collar on said drive shaft and abutting a top surface on said housing and effective to transmit the weight of said electric motor from said drive shaft to said housing, a handle secured to and extending from said housing in the general direction of said drive shaft, means engaging said handle for releasably holding against bodily rotation said electric motor when said electric motor is detachably coupled to said drive shaft, and ground-engaging wheels mounted on said housing to revolve about a transverse axis parallel to said cutting edge and passing through said recess.

References Cited in the file of this patent

UNITED STATES PATENTS

| | | |
|---|---|---|
| 1,660,764 | Pidlisny | Feb. 28, 1928 |
| 1,902,114 | Beanblossom | Mar. 21, 1933 |
| 1,979,554 | Huntington | Nov. 6, 1934 |
| 2,458,200 | Renfroe et al. | Jan. 4, 1949 |
| 2,465,192 | Booth | Mar. 22, 1949 |
| 2,544,461 | Leitzel | Mar. 6, 1951 |
| 2,586,917 | Conforto | Feb. 26, 1952 |
| 2,775,857 | Holmes et al. | Jan. 1, 1957 |